Figure 1:
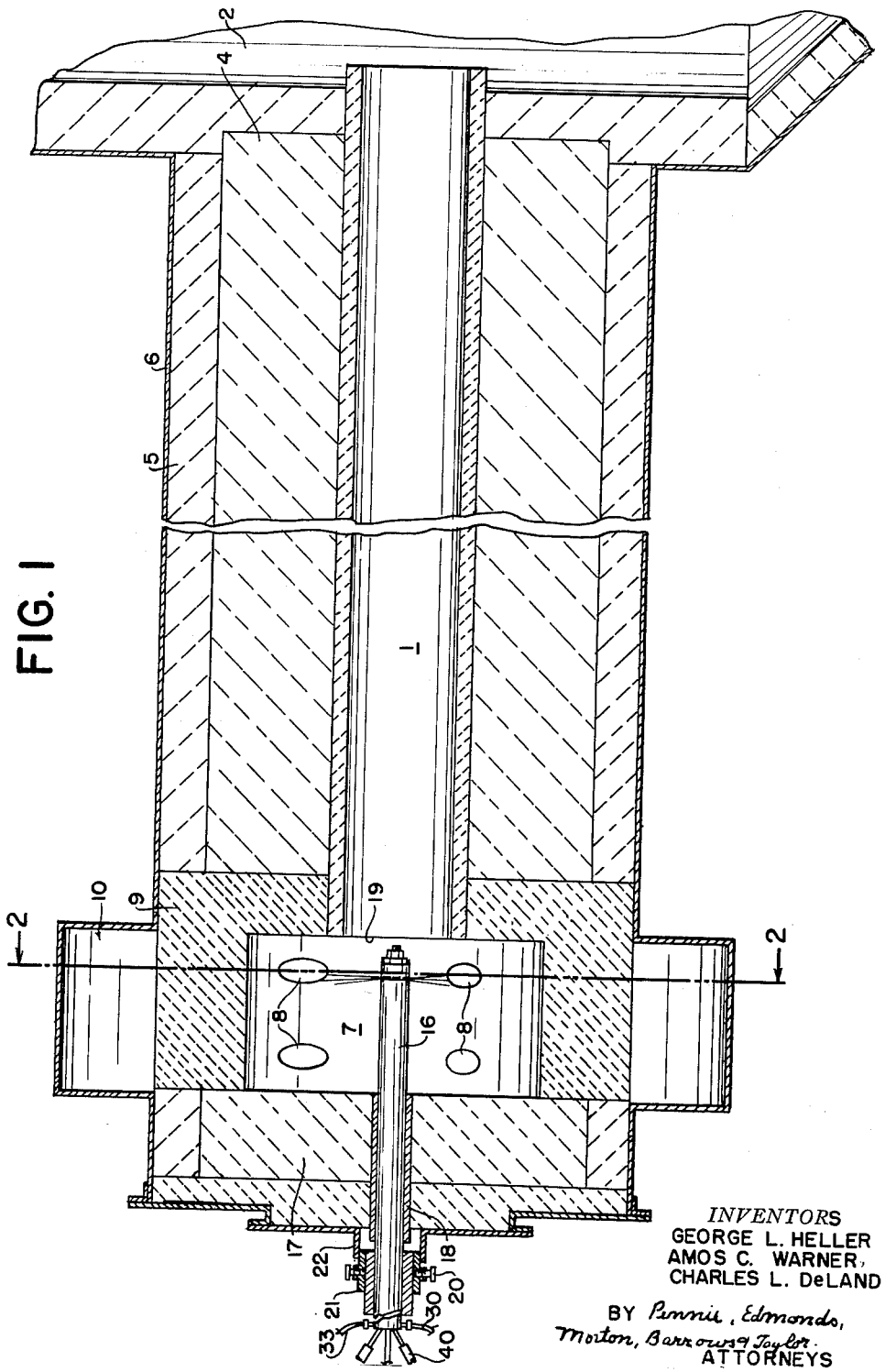

July 24, 1962    G. L. HELLER ETAL    3,046,096
CARBON BLACK MANUFACTURE
Filed Dec. 2, 1958    5 Sheets-Sheet 1

INVENTORS
GEORGE L. HELLER
AMOS C. WARNER,
CHARLES L. DeLAND
BY Pennie, Edmonds,
Morton, Barrows & Taylor.
ATTORNEYS July 24, 1962

G. L. HELLER ETAL 3,046,096

CARBON BLACK MANUFACTURE

Filed Dec. 2, 1958

5 Sheets-Sheet 2

INVENTORS
GEORG L. HELLER
AMOS C. WARNER
CHARLES L. DeLAND

BY Pennie, Edmonds, Morton, Barrows & Taylor.
ATTORNEYS

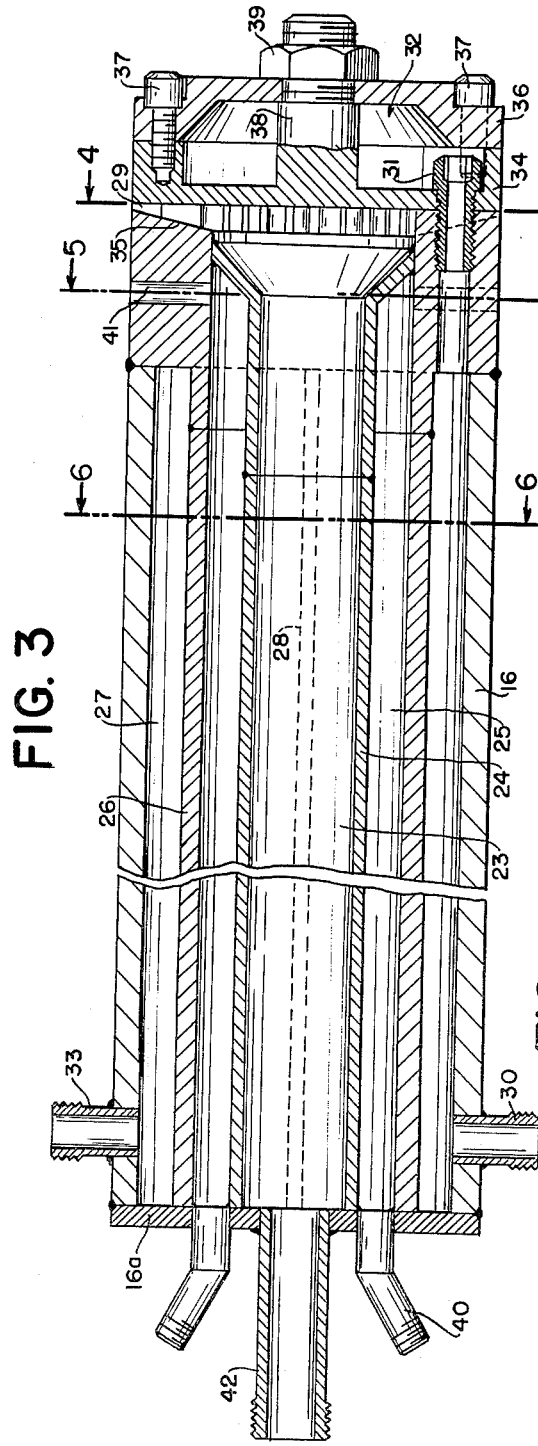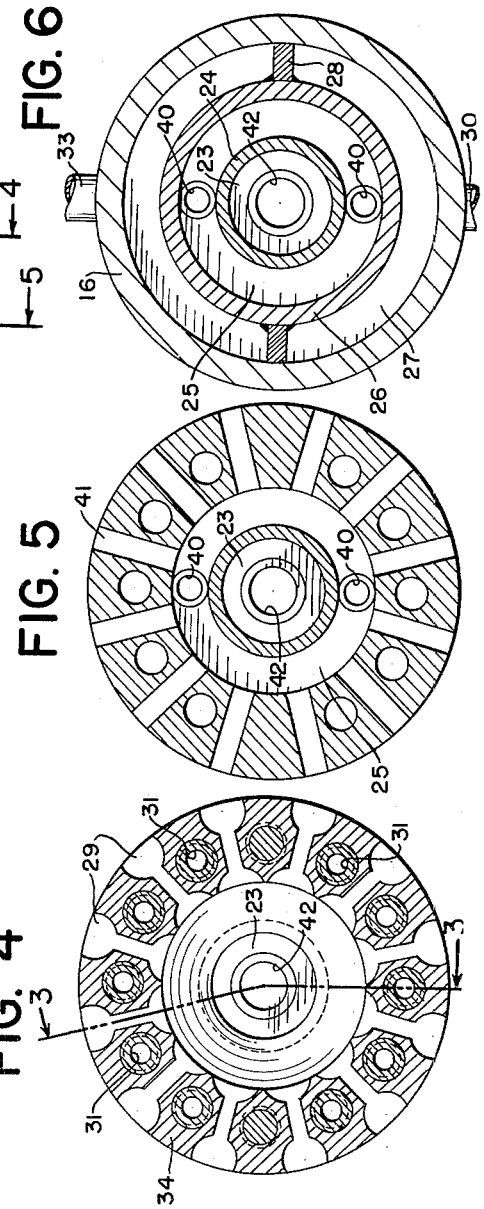

INVENTORS
GEORGE L. HELLER
AMOS C. WARNER
CHARLES L. DeLAND
BY Pennie, Edmonds,
Morton, Barrows & Taylor.
ATTORNEYS July 24, 1962 G. L. HELLER ETAL 3,046,096
CARBON BLACK MANUFACTURE
Filed Dec. 2, 1958 5 Sheets-Sheet 5
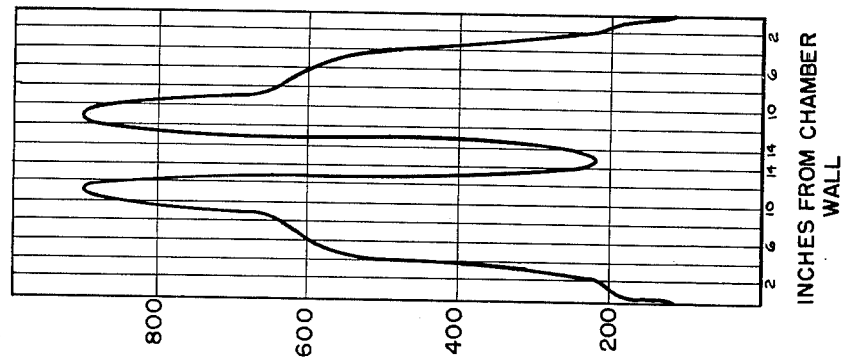
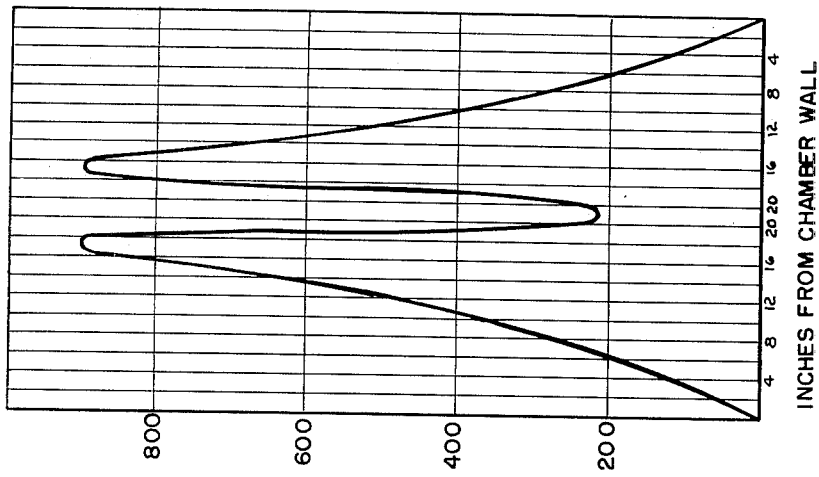
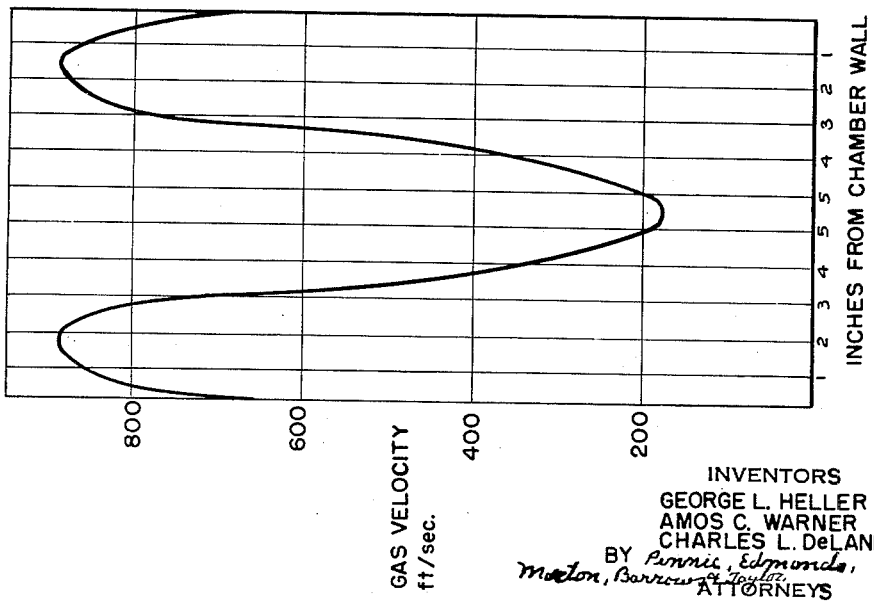
INVENTORS
GEORGE L. HELLER
AMOS C. WARNER
CHARLES L. DeLAND
BY Pennie, Edmonds,
Morton, Barrows & Taylor.
ATTORNEYS United States Patent Office 3,046,096
Patented July 24, 1962

3,046,096
CARBON BLACK MANUFACTURE
George L. Heller and Amos C. Warner, Monroe, and Charles L. De Land, West Monroe, La., assignors to Columbian Carbon Company, New York, N.Y., a corporation of Delaware
Filed Dec. 2, 1958, Ser. No. 777,635
10 Claims. (Cl. 23—209.4)

The present invention relates to the production of carbon black by the decomposition of hydrocarbons and, more particularly, to processes of the type whereby the hydrocarbon to be decomposed is separately and forcefully injected into a stream of hot blast flame gases and rapidly mixed therewith, whereby the hydrocarbon is decomposed by heat absorbed from the hot gases to form carbon black in gaseous suspension.

An especially advantageous process of that type has been described and claimed in the W. C. Ekholm Patent No. 2,599,981 in accordance with which a violently swirling stream of hot blast flame gases is established and maintained in an elongated, unobstructed, heat-insulated reaction chamber of circular cross-section and the hydrocarbon to be decomposed, herein designated hydrocarbon make, is introduced through the side wall of the furnace chamber and injected radially into the swirling, hot gas stream passing through the chamber.

The present invention relates more particularly to improvements in that type of process just described, which have been found to be especially advantageous in such operations in which a heavy hydrocarbon tar or residue is used as the hydrocarbon make. The invention also includes improved apparatus especially adapted to the carrying out of the process.

Hydrocarbon tars or residues are extensively used for the production of carbon black because of their ready availability at relatively low costs and their high combined carbon content. Coal tars and highly aromatic residues, obtained, for instance, by thermally cracking recycled stock from the catalytic cracking of petroleum to produce motor fuels and the like, have been widely used for this purpose.

Carbon black is extensively used in the compounding of rubber for producing automobile tires, and the like. It is, of course, desirable that the rubber composition of automobile tires possess high tensile strength. It is likewise desirable that such compositions possess good rebound characteristics so as to minimize overheating in use. The rubber-compounding characteristics of the carbon black used greatly influence these and other characteristics of the finished tire.

Unfortunately, it has been found that carbon blacks which impart high tensile strength to such rubber compositions usually do not impart high rebound, and that carbon blacks which impart optimum hysteresis characteristics to the rubber, as indicated by high rebound, usually have lower tensile strength characteristics.

The present invention provides a method and means whereby carbon blacks embodying both high tensile strength and high rebound characteristics may be economically produced from the heavy, aromatic tars and residues previously described.

The process of the present invention differs from that of the Ekholm patent, just noted, primarily, in the reversing of the direction in which the hydrocarbon make is radially injected into the swirling stream of hot blast flame gases, i.e. the hydrocarbon make is injected radially outwardly from the center of the furnace chamber into the hot, swirling gas stream, instead of radially inwardly from the outer periphery of the hot gas stream, and thereby utilizing in a unique manner, and to greater advantage, the velocities of the swirling hot gas stream and entering make stream.

The present process, accordingly, comprises establishing and maintaining within the cylindrical reaction chamber a stream of hot blast flame gases moving longitudinally therethrough along a helical path at high velocity, and injecting the liquid hydrocarbon make, as a gas-atomized spray, into the hot gas stream from a position at, or in close proximity to, the longitudinal axis of the chamber and directed radially outwardly toward the delineating side wall of the chamber.

As more fully hereinafter described and illustrated, when a helically flowing gas stream is established within a cylindrical chamber, such as that with which we are here concerned, for instance, by injecting a combustible gaseous mixture into the upstream end of the chamber in a direction substantially tangential to the inner circular side wall thereof and burning the mixture therein, we have found that there is a very substantial difference in linear velocity of the hot gases along their helical path at various zones over a transverse section of the upstream end of the chamber. This velocity has been found to be relatively slight in a circular zone of substantial diameter coaxially with the longitudinal axis of the chamber. This zone of relative low velocity may have a diameter approximately one-half that of the chamber. But outwardly beyond this central zone the swirling of the blast gases is greatly intensified, reaching a maximum or peak velocity and again diminishing as the chamber side wall is approached, as hereinafter illustrated.

In accordance with the present invention, it is essential that the mass velocity of the hydrocarbon make spray, relative to the mass velocity of the swirling blast flame gases, be such that the spray of make penetrates the hot gas stream to the zone of maximum velocity before being entirely dispersed. The mass velocity ratio necessary to establish this condition, will vary somewhat with the diameter of the chamber, but may be readily determined by visual observation through the customary "peep-holes" during operation and necessary adjustments made to establish and maintain this prescribed condition.

Figure 2:
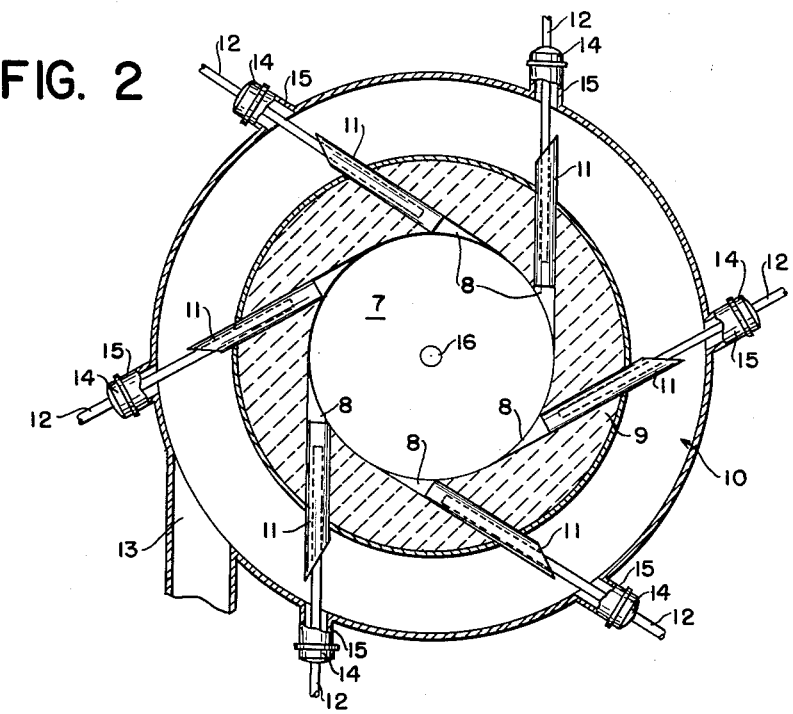
Figure 7:
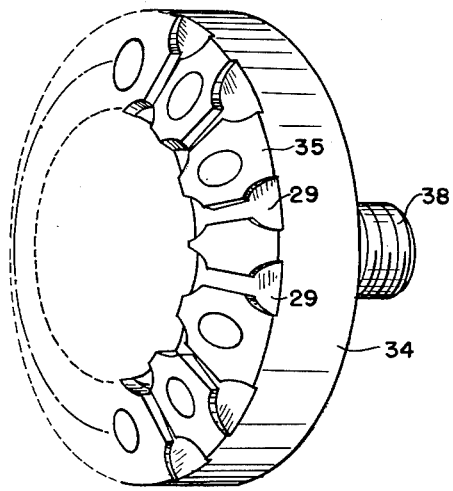
Figure 8:
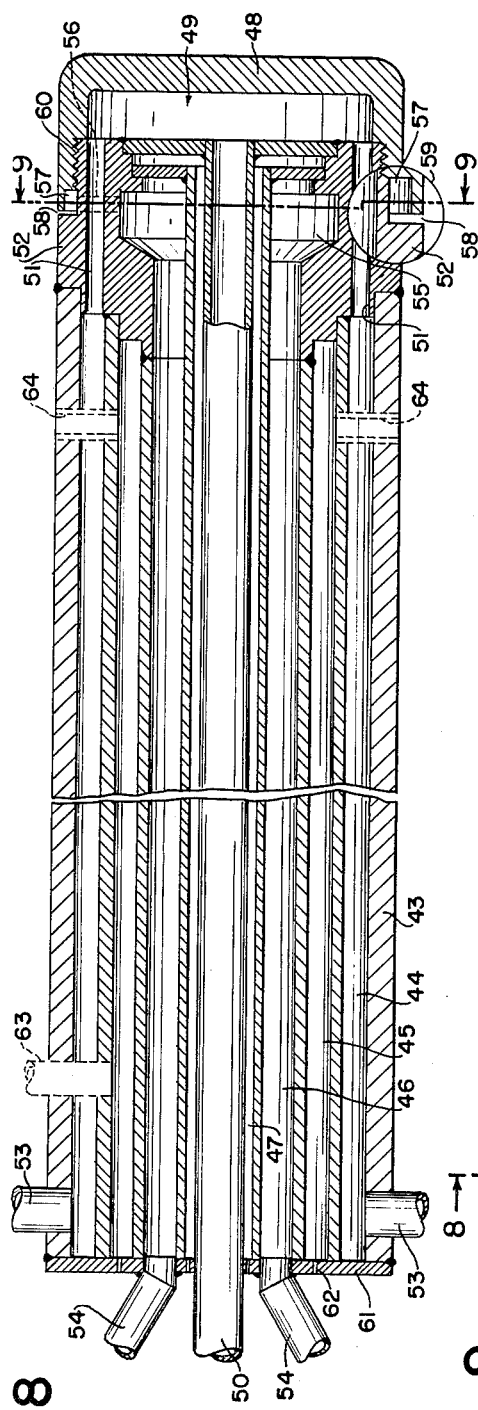
Figure 10:
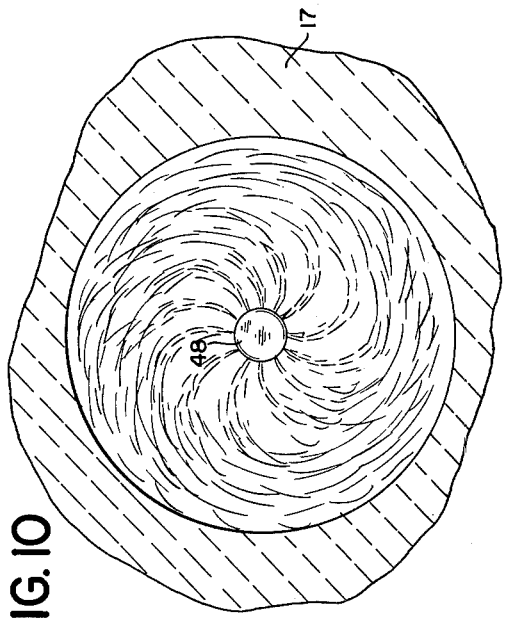
Figure 9:
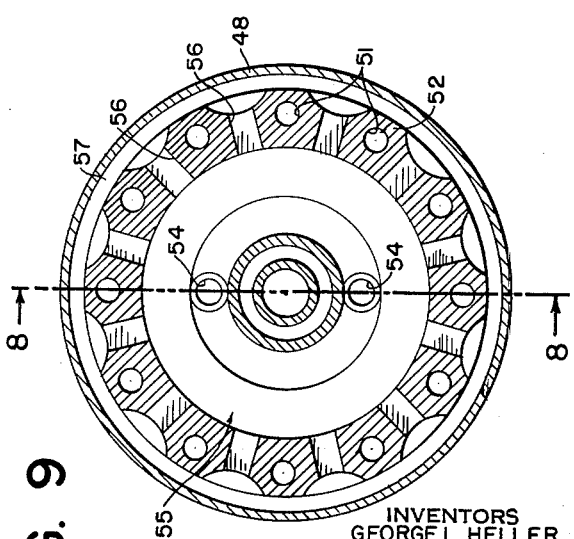

The invention will be further described and illustrated with reference to the accompanying drawings of which:

FIG. 1 represents, somewhat fragmentarily and diagrammatically, a longitudinal sectional view of a carbon black furnace of circular cross-section embodying the present invention, FIG. 2 is a transverse sectional view along the line 2—2 of FIG. 1, FIG. 3 is a somewhat enlarged longitudinal sectional view of a spray assembly, taken along line 3—3 of FIG. 4, especially adapted to the injecting of the liquid hydrocarbon make, FIG. 4 is a transverse sectional view along the line 4—4 of FIG. 3, FIG. 5 is a transverse sectional view along the line 5—5 of FIG. 3, FIG. 6 is a transverse sectional view along the line 6—6 of FIG. 3, FIG. 7 is a perspective view of the convex half of the oil-steam orifice head of the assembly of FIG. 3, FIG. 8 is an enlarged longitudinal sectional view of a somewhat different form of spray assembly, which has been used with particular advantage for injecting the liquid hydrocarbon make, FIG. 9 is a transverse sectional view along line 9—9 of FIG. 8, FIG. 10 is a graphic illustration of the hydrocarbon make spray pattern formed when using a spray assembly of the type shown in FIGS. 3, 4, 5, 6 and 7 of the drawings, FIG. 11 is a graphic illustration of the variation in blast gas velocity over the cross-sectional area of a cylindrical reaction zone, 11 inches in diameter, of the type shown in FIG. 1, just downstream from the entrance of the combustion zone thereto, FIG. 12 is a graphic illustration of the variation in blast gas velocity over the cross-sectional area of a combustion zone 42 inches I.D. and 12 inches long at a section at its entrance into an 11 inch I.D. reaction zone of a furnace such as shown in FIG. 1, and FIG. 13 is a graphic illustration of the variation in blast gas velocity over the cross-sectional area of a combustion zone 30 inches I.D. and 16 inches long at a section 4 inches upstream from the entrance to an 11 inch I.D. reaction zone as shown in FIG. 1.

Referring to FIG. 1 of the drawings, there is represented at 1 an elongated cylindrical reaction chamber leading at its downstream end into a vertical cooler, fragmentarily represented at 2. The cylindrical wall 3 of chamber 1 is of suitable furnace refractory adaptable to withstand the necessary high temperatures and is surrounded by a layer of fire brick 4, which, in turn, is surrounded by a layer of heat-insulating material 5, all encased by metal jacket 6.

At its upstream end, the chamber 1 is enlarged to form a combustion zone 7 of a diameter substantially in excess of its length to provide a larger volume for the burning of a combustible mixture, of fuel gas and air, for instance, introduced into zone 7 through burner ports 8 directed into zone 7 substantially tangential to the cylindrical side wall thereof, as more fully shown in FIG. 2.

The enlargement of chamber 1 at its upstream end, as shown at 7, for instance, makes it possible to increase the rate at which the hot blast flame gases are generated and has been generally found advantageous. However, it will be understood that the present invention, in its broader aspect, is applicable to operations of the type described carried on in furnace chambers of substantially uniform diameter throughout. Further, the particular construction of the furnace, except as hereinafter prescribed, may be varied considerably without departing from the scope of this invention. For instance, the hot blast flame gases may be separately generated outside of the chamber shown and the hot products of combustion, at the necessary temperature to decompose the hydrocarbon make, injected tangentially into the chamber. It is essential, however, that there be established and maintained within the furnace chamber a swirling stream of the hot blast flame gases flowing longitudinally through the chamber along a helical path at high velocity, as previously noted.

The enlarged combustion zone 7 is circular in cross-section and coaxially positioned with respect to chamber 1 and is delineated by walls of furnace refractory 9. An annular air chamber 10 is positioned about the outer wall of combustion zone 7 and is connected thereto by a plurality of burner ports 8 provided with burner tubes 11, cut diagonally at their outer ends, and through which fuel inlet pipes 12 extend coaxially. Air for combustion is delivered under pressure tangentially to chamber 10 through air conduit 13.

In FIG. 1 two separate sets of tangential burners are shown. It will be understood that only one set of burner ports is usually required but that where two are provided, they may be used either interchangeably, depending upon operating conditions required, or both sets of burner ports may be used simultaneously without departing from the scope of this invention. The fuel pipes 12 are removably supported by caps 14, threaded onto, or otherwise secured to, the projecting tubes 15.

Hydrocarbon make injection assembly 16 extends coaxially through the upstream furnace wall 17 into the combustion zone 7 and, where it passes through the furnace wall, is surrounded by a sleeve 18 through which the assembly is free to slide, so as to adjust the position of the spray head thereof with respect to the burner ports 8 and with respect to the downstream end wall 19 of the combustion zone. This adjustment may be accomplished by appropriate manipulation of the set screws 20 extending through collar 21 which is secured to the furnace structure by flanges 22.

This spray assembly will be more fully described with reference to FIG. 3. As there shown, the spray assembly comprises a central, cylindrical passageway 23, delineated by tube wall 24, and surrounded by a coaxial annular passageway 25 lying between tube wall 24 and tube wall 26. The annuular passageway 25 is in turn surrounded by coaxial passageway 27 of annular form but divided in halves by partitions 28, all as more fully shown in FIGS. 3 and 6 of the drawings. The outer end of the assembly is closed by end wall 16a.

At the inner end of the spray assembly, the passageway 23 flares outwardly and communicates with a plurality of radially directed spray ports 29, as more clearly shown in FIGS. 4 and 7, these ports being enlarged at their inner and outer ends and somewhat restricted at their intermediate portion. The outer ends of these ports open directly into the furnace chamber through narrow slots, advantageously of a width of the order of 3/64 of an inch, through which streams of the liquid hydrocarbon make is sprayed radially into the furnace chamber in admixture with the atomizing gas, advantageously steam, under pressure.

In operation, the conduit 23 and the spray ports 29 are protected from overheating by passing water, or other cooling medium, into the jacket 27 through inlet 30, and along one side of the partitions 28, through hollow cap screws 31 into end chamber 32, positioned at the innermost end of the spray assembly, and outwardly therefrom through corresponding hollow cap screws 31 and passageway 27, on the other side of the partition 28, from which it is discharged through outlet 33.

As appears more clearly from FIG. 3, the inner end of the spray assembly comprises a spray head 34, convex at its upstream end to fit nicely against the concave portion 35 of the spray assembly and secured thereto by the hollow cap screws 31, advantageously adjustable, so as to vary the longitudinal width of the spray ports 29 at their outer ends. Beyond the spray head 34 is the end cap 36 secured to head 34 by means of machine screws 37 and by shank 38, extending outwardly from spray head 34 and constituting an integral part thereof, and nut 39.

Where the hot blast flame gases are of an oxidizing nature, it is frequently desirable to neutralize the oxidizing capacity of the hot blast flame gases before they come into contact with the liquid hydrocarbon make, as more fully described in Patent 2,782,101. For this purpose, the spray assembly just described is provided with the annular passageway 25 to which a gaseous fuel, advantageously natural gas, is passed through one or more inlets indicated at 40 and is jetted into the furnace chamber through radially directed gas ports 41, as shown more clearly in FIGS. 3 and 5.

The spray assembly just described is especially adapted to the injection of liquid hydrocarbon make as separate sprays, dispersed in steam or other atomizing gas by well-known conventional means, not necessary here to describe, and from which the dispersion is passed to tube 23 through inlet 42.

The inner portion of this spray assembly, where deposits are more likely to form, is readily disassembled for cleaning by removing nut 39, machine screws 37 and hollow cap screws 31. The remaining portions of the assembly may be fastened together in any suitable manner, advantageously by welding as indicated in the drawings.

A modified, and somewhat simplified, spray assembly especially adapted to the injection of the gas-atomized make spray in the form of a radially-extending disk, and which has been used with particular advantage, is represented at FIG. 8. The assembly there shown comprises an outer casing 43 within which there are coaxially positioned four annular chambers 44, 45, 46 and 47. The innermost end of the assembly comprises a screw cap 48 forming the inner walls of a cooling-fluid chamber 49.

In operation, water or other suitable cooling fluid, is passed through tube 50, coaxially extending through annular chamber 47, into cooling chamber 49 from which it passes outwardly through openings 51, extending through spray head 52, through the annular cooling jacket 44, from which it passes through one or more exit tubes 53.

The liquid hydrocarbon make, dispersed in steam or other atomizing gas as previously described, is introduced under pressure through one or more inlet tubes 54 and passes through the annular chamber 46 into the enlarged chamber 55 within the spray head 52. From chamber 55, the steam-oil mixture passes under pressure through ports 56 into the annular chamber 57 from which it passes through the radially-extending slot 58 into the furnace chamber, the annular chamber 57 and slot 58 being shown on a somewhat enlarged scale within circle 59 of FIG. 8, for clarity.

The width of the slot 58 may be varied by adjustment of cap 48, for instance by turning cap 48 with respect to head 52 to which it is secured by threads indicated at 60, shims being used to insure a tight closure, where necessary.

The annular chambers shown at 45 and 47 may be dead-air spaces and vented through end plate 61 through vents indicated at 62 to avoid excessive pressure build-up. Where it is desired to use auxiliary gas, as described with respect to FIG. 3, the spray head of FIG. 8 may be modified as indicated in dotted lines whereby natural gas or the like is charged through gas inlet 63 into the annular chamber 45 and passes therefrom into the furnace chamber through the radially projecting orifices 64. When so modified, the vents 62 leading from chamber 45 will, of course, be closed.

Should it become necessary to clean the assembly just described, it is only necessary to remove cap 48 in order to obtain access to all portions of the nozzle assembly where deposits would be apt to accumulate. The remaining elements of the assembly may be permanently fastened together in any suitable manner, for instance by welding, as indicated in the drawing.

In carrying out the process of the present invention, a combustible mixture, advantageously a gaseous fuel and air, may be injected tangentially into combustion zone 7 through the burner ports 8 and burned as it enters the chamber to form a swirling stream of hot blast flame gases passing longitudinally through the chamber along a helical path at high velocity. As previously noted herein, we have found that under such conditions the linear velocity of these blast flame gases varies materially over the cross-sectional area of the furnace chamber. This velocity variation is illustrated in FIGS. 11, 12 and 13 of the drawings in which the gas velocity, in feet per second, is plotted against distance, in inches, from the chamber wall.

FIG. 11 illustrates this velocity variation at a section just downstream from the entrance of the swirling gas stream from the enlarged combustion zone into an 11-inch I.D. reaction chamber of a furnace of the type shown in FIG. 1. From this graph, it appears that the linear velocity of the swirling gases in a coaxial zone at the center of the chamber is only about 200 feet per second while in the zone approximately 2 inches inwardly from the chamber wall the velocity is in excess of 800 feet per second. At even less distances from the chamber wall, there is a material drop in linear velocity of the swirling gases, but even here the gas velocity is substantially in excess of that in the vicinity of the axis of the chamber. Further, it will be noted from this graph that the velocity drops sharply on either side of the peak velocity prevailing in a zone extending inwardly from the furnace wall a distance of about 1/6 to about 1/3 the chamber radius.

FIG. 12 represents this velocity variation in a furnace of the type shown in FIG. 1 having a reaction chamber 11 inches in diameter preceded by an enlarged combustion zone 42 inches I.D. and 12 inches long at a section at the extreme downstream end of the combustion zone. At this point, the central core of relatively low velocity is approximately 5 inches in diameter, and just to the outside of the core the velocity rises sharply from about 200 feet per second to a peak of 900 feet per second and again dropped off sharply in the direction of the outer wall.

FIG. 13 illustrates this condition in a similar furnace having an enlarged combustion zone 30 inches I.D. and 16 inches long at a section 4 inches upstream from the entrance to the 11 inch I.D. reaction chamber. It will be noted that the pattern is very similar to that of FIG. 12.

While the data on which these graphs are based may not be entirely accurate, they were arrived at by accepted engineering methods and serve to illustrate the manner in which the gas velocity varies relatively over the diameters of various sections of the furnace chamber.

As shown by these graphs the position of this zone of peak velocity has been found to vary somewhat with the diameter of the particular furnace chamber and the particular section thereof. It will also vary somewhat with the initial inlet velocity of the tangentially injected combustible mixture or hot blast flame gases. But for any operation, this zone of peak velocity is readily determinable by conventional gas-velocity-measuring equipment and when plotted against distances from the chamber wall, as in FIGS. 11, 12 and 13, the curve will be found to conform generally to those shown.

We have found that we can utilize to great advantage this difference in linear velocity of the hot blast flame gases to control the characteristics of the resultant carbon black and to minimize the difficulties heretofore experienced in operations in which a gas-atomized residual hydrocarbon or tar is radially injected into the swirling blast gas stream.

One such difficulty is believed to be due to the presence of substantial amounts of thermally stable colloidal bituments, or other carbonaceous or coky materials, in these heavy hydrocarbon residues. While we do not intend to be bound to any such theory, it is our present belief that these coke-like particles and colloidal bitumens are, in conventional practice, carried through the furnace chamber and are thereafter collected with the carbon black, deleteriously affecting the rubber compounding characteristics of the black, and that in accordance with our present invention these thermally stable colloidal bitumens and the like, injected into the furnace chamber with the make, are quickly separated from the desirable carbon black-forming hydrocarbons, as the make is injected into the hot gas stream, by being thrown by centrifugal forces, or otherwise, against the furnace wall and there burned.

But regardless of theory, we have found that the previously described marked improvement in the resultant carbon black is obtained in accordance with our present inventon by injecting the liquid hydrocarbon spray radially outwardly from the zone of minimum gas velocity into the zone of maximum gas velocity. Within the zone of minimum blast gas velocity, the mass velocity of the hot blast gases is, of course, at a minimum. On the other hand, the radial velocity of the liquid hydrocarbon make syrays is at a maximum at the point of injection and consequently the mass velocity of the spray streams is at a maximum. Therefore, the entering liquid spray is not immediately shattered and dispersed by the hot blast flame gases, as in the process of the Ekholm Patent 2,599,-981, nor is there formed a central core of concentrated hydrocarbon as previously proposed by injecting the hydrocarbon make axially into the chamber.

In accordance with the present invention, the injected hydrocarbon spray passes substantially radially outwardly, by reason of its relative high mass velocity, until it approaches the maximum blast gas velocity zone. The spray is then struck by the extremely high velocity blast flame gases and the hydrocarbon thereby subjected to tremendous shearing action and centrifugal forces. It is believed that by reason of these centrifugal forces and the initial high velocity of the make spray the coke-like and other solid particles present in the hydrocarbon make are thrown outwardly into the zone of diminishing velocity adjacent the chamber wall and the there consumed, probably aided by catalytic action of the chamber wall.

A diagrammatic representation of the pattern of the liquid hydrocarbon make spray injected as separate streams by means of an atomizing spray assembly, such as represented at FIG. 3 of the drawing, is shown in FIG. 10. A somewhat similar pattern is formed when a continuous radial disk spray of the hydrocarbon make is injected into the furnace chamber, as by means of the spray assembly shown in FIG. 8.

The longitudinal position of the radial make spray is subject to considerable variation. In a furnace of the type shown, it may be positioned either in the enlarged combustion zone, advantageously in the downstream half thereof, or in the upstream end of the reaction chamber of reduced diameter. The optimum position will depend to some extent upon the desired properties of the resultant carbon black.

We have found, for instance, that in a furnace of the type shown in the drawings having a combustion zone of 33 inches I.D. and 21 inches long and a downstream section 11 inches I.D., the spray position may be varied over a zone ranging from 2 inches to 6 inches upstream from the entrance to the reduced section, other conditions remaining constant, without material changes in the property of the carbon black. However, when moved to a position within the range of 8 inches to 10 inches upstream from the entrance to the reduced section, the resultant black has been found to change from an ISAF grade to an HAF grade. Where the spray is moved to a position within the combustion zone less than 2 inches upstream from the entrance to the reduced section, a somewhat finer product has resulted.

In a similar furnace having a combustion zone 30 inches I.D. and 16 inches long, we have, with advantage, operated with the make spray positioned in the enlarged combustion zone 4 inches upstream from the reduced section for producing an ISAF grade black of high quality.

The initial velocity of the make spray, partly vaporized by the atomizing stream, at the point of discharge from the spray nozzle, is of the order of 1600 to 3200 feet per second, and nonvaporizable portions of the oil will be injected into the furnace at substantially those velocities. But these unvaporizable portions of the oil, previously referred to as colloidal bitumens, have a specific gravity ranging from 1.06 to 1.21, weighing between 66 and 76 pounds per cubic foot, whereas blast flame gases at operating temperatures weigh about 0.015 pound per cubic foot. Thus the mass velocity of these unvaporized portions of the make exceeds that of the blast gases by a factor approximating 8000:1 and, therefore, they are not diverted from their radial path.

The invention and the effectiveness thereof will be further illustrated by the following specific examples.

EXAMPLE I

These operations were carried out in a carbon black furnace, such as illustrated in FIGS. 1 and 2 of the drawings, of which the longitudinal dimension of the enlarged combustion zone was 16 inches, the diameter thereof was 30 inches, the smaller diameter of the reaction chamber was 11 inches and the longitudinal dimension of that portion of the chamber was about 11 feet. The furnace was provided with two sets of tangential blast burners of six burners each symmetrically positioned about the chamber, the respective sets of burners entering the combustion zone about 3½ inches from the upstream and downstream end walls of that zone. These burner ports were 3 inches inside diameter. In these runs all burner ports were in operation.

In a furnace of this type and of the stated dimensions it has been found especially advantageous to adjust the spray longitudinally to a position not less than four inches nor more than seven inches upstream from the downstream end-wall of the enlarged combustion zone, and in the following run A, made in accordance with the present invention, the spray was positioned 4 inches from said wall.

In each of these operations, the hydrocarbon make was a highly aromatic residual oil of the type currently used in the production of carbon black. Fuel gas, consisting of natural gas, was charged to the furnace at a total rate of 15,400 cubic feet per hour and air for combustion was charged at a rate of 180,000 cubic feet per hour.

In operation A, carried on in accordance with the present invention, the hydrocarbon make, dispersed by steam at a pressure of 75 lbs. per sq. in., was charged at a rate of 155 gallons per hour through a spray assembly of the type illustrated in FIG. 3 adapted to inject 12 symmetrically positioned spray streams radially outwardly into the swirling stream of hot blast flame gases. The spray head of this assembly was approximately 2½ inches in diameter.

In run B, here shown for the purpose of comparison, the operating conditions were substantially identical with those just described except that the hydrocarbon make was directed radially inwardly into the swirling blast flame gas stream as described in the previously noted Patent No. 2,599,981.

The colloidal and chemical characteristics of the carbon black resulting from the respective runs are set forth in the following tabulation:

Table I

| Run | A | B |
|---|---|---|
| ABC Color | 141 | 140 |
| Tinting Strength, percent Standard | 121 | 117 |
| Oil Absorption, Gallons per 100 Pounds | 15.7 | 15.0 |
| Iodine Adsorption | 107 | 93 |
| Surface Area, sq. meters/gm | 131 | 126 |
| Benzene Extractable, percent | 0.08 | 0.06 |
| Volatile, percent | 1.4 | 2.9 |
| pH Characteristic | 7.2 | 8.1 |

When the respective carbon blacks were compounded with natural rubber, in accordance with identical formulations, and the resultant rubber compositions cured and tested by standard procedure, the following values were obtained:

Table II

| Run | A | B |
|---|---|---|
| Cured at 275° F. for 35 Minutes: | | |
| L-300 | 1,360 | 1,260 |
| L-500 | 3,130 | 2,870 |
| Tensile | 4,530 | 4,360 |
| Percent Elongation | 670 | 680 |
| Shore Hardness | 53 | 51 |
| Cured at 275° F. for 70 Minutes: | | |
| L-300 | 1,875 | 1,620 |
| L-500 | 3,875 | 3,450 |
| Tensile | 4,700 | 4,540 |
| Percent Elongation | 605 | 640 |
| Shore Hardness | 57 | 57 |
| Percent Rebound | 67.8 | 66.2 |
| Electrical Resistivity, Log R | 2.7 | 3.0 |
| Maximum Tensile | 4,700 | 4,550 |

It will be noted that both the tensile strength and percent rebound values of the product of run A are materially greater than those of run B.

EXAMPLE II

In a further series of runs in a furnace of substantially the same dimensions as that used in the preceding run A, air was charged at the rate of 158,000 cubic feet per hour, the air-fuel gas ratio was 12.2:1 and a heavy aromatic hydrocarbon make, such as used in run A, was charged at the rate of 174 gallons per hour. The oil was preheated to the temperature of 400° F. and the atomizing gas was steamed at a pressure of 80 pounds per square inch. In run C, the radially-directed spray was positioned 4 inches upstream from the entrance to the reduced section of the furnace chamber. In run D, the spray was positioned flush with the downstream end wall of the enlarged combustion zone, and in run E the spray was positioned within the reduced section of the furnace chamber 4 inches downstream from the entrance thereto.

The characteristics of the resultant carbon blacks and their rubber compounding chracteristics in synthetic rubber are set forth in the following tabulation:

*Table III*

| Run | C | D | E |
|---|---|---|---|
| Color, ABC | 139 | 141 | 141 |
| Tinting Strength, Percent Standard | 115 | 119 | 116 |
| Oil Absorption, Gallons per 100 lbs | 14.9 | 15.4 | 15.4 |
| Iodine Absorption | 72 | 69 | 72 |
| DPG Absorption | 5.41 | 5.06 | 5.78 |
| Rubber Properties: | | | |
| Cure Time, minutes | 40 | 37 | 35 |
| L-300 | 1,360 | 1,435 | 1,450 |
| Tensile Strength | 3,525 | 3,650 | 3,625 |
| Percent Elongation | 615 | 625 | 610 |
| Shore Hardness | 55 | 56 | 57 |
| Log R Elec. Resistivity | 3.5 | 3.7 | 3.5 |
| Percent Rebound | 50.6 | 50.6 | 50.6 |
| Abrasion Resistance | 94 | 91 | 95 |
| Maximum Tensile | 3,575 | 3,700 | 3,650 |

The foregoing rubber compounding characteristics were determined by conventional methods on identically prepared compositions of LTP-14 (low temperature polymer) synthetic rubber in which the respective carbon black products were incorporated.

EXAMPLE III

A further series of runs was carried out in a furnace such as used in run A of Example I except that the enlarged combustion zone was 33 inches I.D. and 21 inches deep. In these runs, air was charged to the furnace at the rate of 160,000 cubic feet per hour, the air-fuel gas ratio was 12.4:1 and the hydrocarbon make was a heavy aromatic hydrocarbon residue and was charged to the furnace at the rate of 168 gallons per hour. In these runs F, G, H and I, the radial spray was positioned 4 inches, 6 inches, 8 inches and 10 inches, respectively, upstream from the entrance to the reduced section of the furnace chamber. The characteristics of the resultant carbon blacks so produced are set forth in the following tabulation:

*Table IV*

| Run | F | G | H | I |
|---|---|---|---|---|
| ABC Color | 139 | 137 | 134 | 133 |
| Tinting Strength, percent Standard | 123 | 122 | 116 | 113 |
| Oil Absorption, Gallons per 100 lbs | 18.2 | 16.9 | 16.0 | 17.0 |

We have found quite surprisingly that, in operations in accordance with the present invention, the oil load i.e., the charging rate of the hydrocarbon make to a furnace of given dimensions, may be materially increased without reduction in particle size of the resultant carbon black. We have further found that by increasing the oil load, carbon blacks having improved rubber-compounding properties may be obtained. The process permits operations at higher than normal oil:air ratios without increase in particle size and with the added advantage of retention of a slight stain characteristic which, in many instances, has been found desirable. Such high oil load operation is illustrated by the following examples:

EXAMPLE IV

In this run made in accordance with our improved method, the apparatus used was identical with that used in run A of Example I. Air was charged to the furnace at the increased rate of 234,000 cubic feet per hour, the air:fuel gas ratio was 12.3:1 and the hydrocarbon make, identical with that used in run A, was charged to the furnace at a rate of 210 gallons per hour. The radial spray was positioned 4 inches upstream from the entrance to the reduced section of the furnace chamber.

The characteristics of the resultant carbon black, and its rubber compounding characteristics in natural rubber, are set forth in the following tabulation under column J. For comparative purposes, there are set forth in column K of the tabulation the characteristics of a high-grade commercial ISAF carbon black, not made by our process but of approximately the same surface area, as determined by the electron microscope.

*Table V*

| | J | K |
|---|---|---|
| Tinting Strength, Percent Standard | 123 | 116 |
| Oil Absorption, Gals./100 lbs | 14.9 | 15.7 |
| Iodine Adsorption, Equivalents×10⁴/gm | 106 | 118 |
| Surface Area, Sq. Meters/gm | 127 | 129 |
| Rubber Properties: | | |
| Cure Time, minutes | 70 | 70 |
| L-300 | 1,925 | 1,800 |
| Tensile Strength | 4,600 | 4,350 |
| Percent Elongation | 580 | 575 |
| Log R, Elec. Resistivity | 2.5 | 2.1 |
| Percent Rebound | 66.2 | 65.1 |
| Percent Roadwear | 104 | 100 |

Here, also, a substantial improvement in both tensile strength, percent rebound, and road wear characteristics are shown.

In determining the rubber compounding characteristics of the carbon blacks of Examples I and IV in natural rubber, the following formulation was used:

| | Parts |
|---|---|
| Natural rubber smoked sheets | 100 |
| Carbon black | 45 |
| Sulfur | 2.75 |
| Zinc oxide | 3 |
| Pine tar | 3 |
| Stearic acid | 3 |
| Agerite HP | 1 |
| NOBS Special | 0.35 |

In determining the rubber compounding characteristics of the carbon blacks of Example II in synthetic rubber, the following formulation was used:

| | Parts |
|---|---|
| LTP (low temperature polymer) | 100 |
| Carbon black | 50 |
| Zinc oxide | 3 |
| Stearic acid beads | 3 |
| Paraflux | 9 |
| B-L-E | 1 |
| Sulfur | 1.6 |
| Altax | 0.6 |
| DPG | 0.75 |

In the foregoing tabulations, Paraflux is a trade name for an asphaltic flux product used as a plasticizer; B-L-E is a trade name for a diphenylamine-acetone reaction product used as an antioxidant; Altax is a trade name for benzothiazyl disulfide used as an accelerator; Agerite HP is a trade name for phenyl-beta-napthylamine plus diphenylparaphenylene-diamine used as an antioxidant; and NOBS Special is a trade name for N-oxydiethylenebenzothiazole-2-sulfenamide used as a delayed action accelerator.

A typical analysis of the heavy aromatic hydrocarbon residue used in the foregoing examples is as follows:

| | |
|---|---|
| Viscosity, SSU at 210° F. | 47 |
| Index of refraction | 1.645 |
| A.P.I. gravity | 1.8 |
| Percent Ramsbottom carbon residue | 8.98 |
| Molecular weight | 264 |

It will be understood, however, that the utility of this invention is not restricted to this particular type of liquid hydrocarbon but, in its broader aspect, also contemplates the use of hydrocarbon distillate oils and other hydrocarbon residues or tars. As previously noted herein, the invention is especially applicable to the use of hydrocarbons of the residuum type containing colloidal bitumens or the like.

We claim:

1. In the process for producing carbon black by the decomposition of hydrocarbons in which there is established and maintained within an elongated, heat-insulated reaction chamber of circular cross-section, a swirling stream of hot blast flame gases passing longitudinally through the chamber along a helical path at high velocity, the axial core of said gas stream swirling at a relatively low velocity and the gas velocity reaching a maximum in an annular zone intermediate said core and the periphery of the chamber, and the hydrocarbon to be decomposed is separately and forcefully injected radially into said hot gas stream and is dispersed therein and decomposed by heat absorbed therefrom to form carbon black in suspension, the effluent passing from the downstream end of the chamber and the carbon black separated and collected, the improvement comprising the step of injecting the hydrocarbon to be decomposed into the hot gas stream as a gas-atomized spray of liquid hydrocarbon initiated adjacent the longitudinal axis of the chamber and directed radially outwardly toward the delineating side wall of the chamber at an initial linear velocity such that the spray penetrates the swirling stream of hot gases to the zone of maximum velocity of said gases.

2. The process of claim 1 in which the hydrocarbon to be decomposed is a high molecular weight, highly aromatic tarry residuum.

3. The process of claim 1 in which the atomizing gas is steam.

4. In the process for producing carbon black by the decomposition of hydrocarbons in which a combustible mixture of a hydrocarbon fuel and an oxygen-containing gas is blasted tangentially into a cylindrical combustion zone of an elongated heat-insulated reaction chamber, said combustion zone having a diameter greater than its length and opening at its downstream end into a coaxially positioned reaction zone of said chamber of smaller diameter and of a length greater than its diameter, and the combustible mixture is burned in the combustion zone to form a swirling stream of hot blast flame gases flowing longitudinally through said chamber at a high velocity along a helical path, the axial core of said gas stream swirling at relatively low velocity and the gas velocity reaching a maximum in an annular zone intermediate said core and the periphery of the chamber, and the hydrocarbon to be decomposed is separately and forcefully injected radially into said hot gas stream and is dispersed therein and decomposed by heat absorbed therefrom to form carbon black in suspension, the effluent passing from the downstream end of the chamber and the carbon black separated and collected, the improvement comprising the step of injecting the hydrocarbon to be decomposed into the hot gas stream as a gas-atomized spray of liquid hydrocarbon initiated adjacent the longitudinal axis of the chamber and directed radially outwardly toward the delineating side wall of the chamber at an initial linear velocity such that the spray penetrates the swirling stream of hot gases to the zone of maximum velocity of said gases.

5. The process of claim 4 in which the radial spray of the liquid hydrocarbon is positioned in the reaction zone of the furnace chamber adjacent the upstream end thereof.

6. The process of claim 4 in which the radial spray of the liquid hydrocarbon is positioned within the downstream half of the enlarged combustion zone.

7. The process of claim 1 in which the hydrocarbon to be decomposed contains colloidal bitumens and the initial linear velocity of the radial spray is such that the mass velocity of said bitumen particles exceeds the maximum mass velocity of the hot blast flame gases.

8. Apparatus for producing carbon black comprising an elongated, heat-insulated furnace chamber of circular cross-section and having at its upstream end a combustion section of greater diameter than its length which opens at its downstream end into a coaxially positioned elongated reaction section of reduced diameter, a plurality of burner ports extending through the wall of the chamber and directed tangentially into said combustion section, means for introducing a combustible gaseous mixture therethrough into the combustion section, a hydrocarbon oil spray assembly comprising an outer cylindrical casing extending coaxially through the upstream end wall of the chamber, an oil chamber positioned in the downstream end of the casing, a conduit extending through the casing and adapted to the passage of a suspension of oil and atomizing gas under pressure into said oil chamber and a constricted, radially-directed, outwardly-extending passageway adjacent the inner end of the spray assembly, the inner end of said passageway being connected with said oil chamber, and whereby a gas-atomized spray of the oil is injected radially into the furnace chamber, said assembly being adapted to be moved longitudinally within the furnace chamber, whereby the position of the spray, relative to the upstream end of the reaction section, may be regulated.

9. The apparatus of claim 8 further characterized in that the constricted, radially-directed passageway extends uninterruptedly about the periphery of the casing, whereby a gas-atomized spray of the oil in the form of a radially-directed disk is injected into the furnace chamber.

10. The apparatus of claim 8 further characterized in that the constricted radially-directed passageway comprises a multiplicity of radially-directed orifices uniformly positioned about the periphery of the casing.

References Cited in the file of this patent

UNITED STATES PATENTS

| | | |
|---|---|---|
| 1,874,002 | Fantz | Aug. 30, 1932 |
| 2,368,827 | Hanson et al. | Feb. 6, 1945 |
| 2,408,282 | Wolf | Sept. 24, 1946 |
| 2,809,098 | Larson | Oct. 8, 1957 |
| 2,825,633 | Steele | Mar. 4, 1958 |
| 2,864,673 | Mannini | Dec. 16, 1958 |